United States Patent
Warrington et al.

[15] 3,699,588
[45] Oct. 17, 1972

[54] RECORDER FOR RECORDING ON HEAT-SENSITIVE MATERIAL

[72] Inventors: Bertil Eck Warrington; Michael J. Cash, both of Phila., Pa.

[73] Assignee: Honeywell Inc., Minneapolis, Minn.

[22] Filed: Dec. 28, 1970

[21] Appl. No.: 101,619

[52] U.S. Cl. ............... 346/139 C, 219/233, 219/543, 346/76
[51] Int. Cl. ............................................. G01d 15/10
[58] Field of Search ........... 346/139 C, 76 R; 178/94; 219/543, 233, 229, 221, 216

[56] References Cited

UNITED STATES PATENTS 1,765,988  6/1930  Mayer et al. ....... 346/139 C X
3,478,191  11/1969  Johnson et al. ............ 219/216

*Primary Examiner*—Joseph W. Hartary
*Attorney*—Arthur H. Swanson and Mitchell J. Halista

[57] ABSTRACT

A recording apparatus for recording on heat-sensitive material including a recording stylus having a mandrel of an electrically insulating material capable of withstanding an elevated recording temperature. Electrical conductors are deposited on the surface of the mandrel to electrically connect a source of electrical power to a deposit of resistive material on a characterized recording end of the mandrel. The mandrel is attached to a stylus support arranged to be selectively driven across a recording material with the electrical conductors being electrically isolated from the stylus support.

9 Claims, 1 Drawing Figure

PATENTED OCT 17 1972　　3,699,588
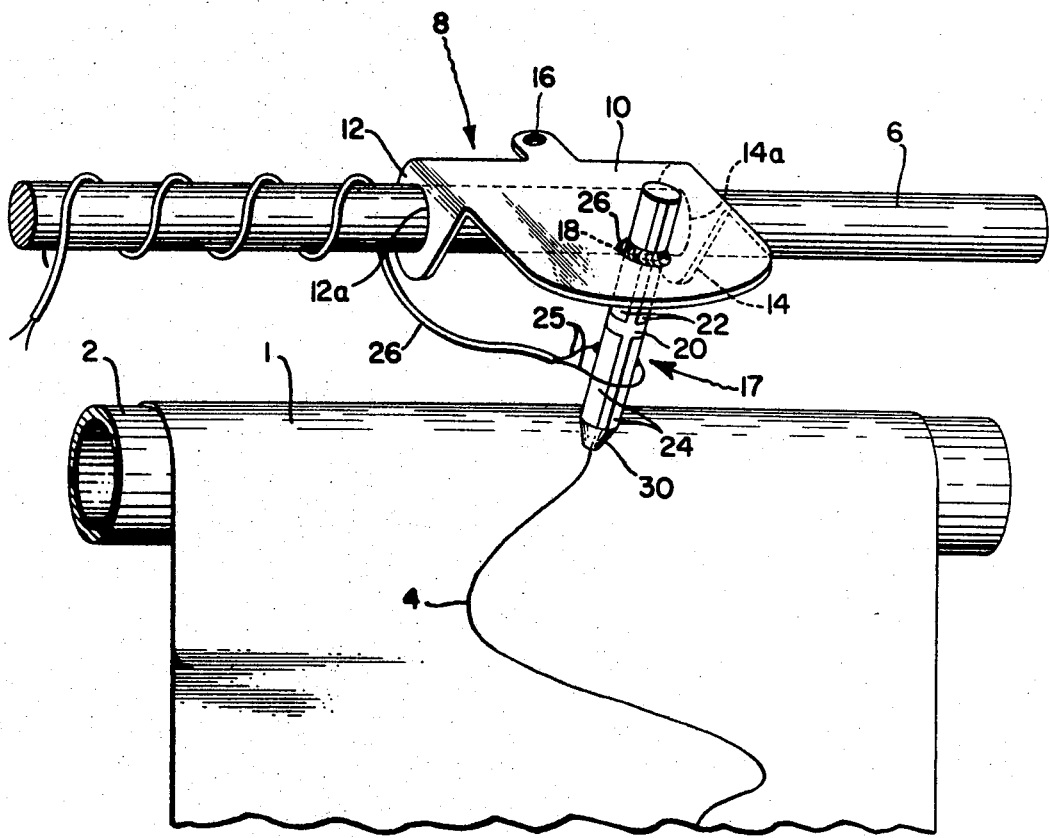
INVENTORS.
MICHAEL J. CASH
BERTIL ECK
BY
M.J. Halista
ATTORNEY.

RECORDER FOR RECORDING ON HEAT-SENSITIVE MATERIAL

BACKGROUND OF THE INVENTION

This invention relates to recorders. More specifically, the present invention relates to a stylus for use in a recorder for recording on heat-sensitive material. Recorders for producing a visible trace on a recording medium responsive to the application of a source of a localized elevated temperature are well-known in the art. Prior art recorders of this type are shown in U.S. Pat. Nos. 1,765,988; 1,820,088; 2,922,688; 2,454,966; 2,478,329 and 3,038,994. However, none of the prior art recorders of this type provide a structure for high-speed analog recording on a heat-sensitive medium. Further, these prior art heat sensitive medium recorders do not have an inexpensive recording stylus structure capable of being easily replaced as well as minimizing the electrical power needed to maintain the operating temperature of the stylus.

An object of the present invention is to provide an improved recording apparatus for recording on heat-sensitive material.

Another object of the present invention is to provide an improved recording apparatus for recording on heat-sensitive material.

Another object of the present invention is to provide an improved stylus for use in a recorder for recording on heat sensitive material.

A further object of the present invention is to provide an improved heat-generating recording stylus and mounting means therefore.

SUMMARY OF THE INVENTION

In accomplishing these and other objects there has been provided, in accordance with the present invention, a recording apparatus using a stylus for generating a localized elevated temperature capable of activating a heat-sensitive recording medium. The stylus includes a mandrel formed from an electrically insulating material capable of withstanding the elevated temperature and arranged to support a pair of separate electrical conductors extending in a longitudinal direction on the surface of the mandrel while being electrically isolated from each other. These conductors are electrically connected to respective wires for connection to a source of electrical power. The conductors are, also, electrically connected to respective sides of a deposit of high electrical resistance material covering one end of the mandrel. An attaching means is mounted on the mandrel on a location electrically isolated from the electrical conductors. The attaching means is used to mount the mandrel on a stylus support member arranged to be selectively driven across a heat-sensitive recording medium.

BRIEF DESCRIPTION OF THE DRAWINGS

A better understanding of the present invention may be had when the following specification is read in connection with the accompanying drawing in which the single FIGURE is a pictorial illustration of a portion of a recording apparatus and an enlarged representation of a recording stylus element embodying the present invention.

DETAILED DESCRIPTION

In the single figure drawing there is shown a heat-sensitive recording medium 1 arranged to be driven across a support roller 2 by any suitable transport means (not shown). The heat-sensitive medium 1 may be any suitable recording medium capable of producing a visible recording in response to the application of a localized source of heat, e.g., the recording paper manufactured by the National Cash Register Company of Dayton, Ohio and identified as Mini Print. The application of a localized source of heat to such a recording medium produces a visible trace recording 4 by the effect of the high temperature on the heat sensitive emulsion coating of the recording medium 1. A cylindrical guiderail 6 is provided in the recording apparatus illustrated in the drawing for slidably supporting a stylus holder 8. The stylus holder 8 includes a stylus support plate 10 having a pair of perpendicular ears 12 and 14 on opposite sides thereof. The ears 12 and 14 extend from the plate 10 in the same direction and are each arranged to have a hole therethrough to accommodate the guiderail 6, e.g. holes 12a and 14a, respectively. The holes 12a and 14a are axialy aligned with each other and may each include a bushing means, e.g., nylon, (not shown) to facilitate a movement of the stylus holder 8 on the guiderail 6. A means for connecting the stylus support 8 to a recorder drive means (not shown) is provided on the support means 8 in the form of an eye 16.

A stylus 17 for applying heat to a localized area of the recording medium 1 includes a ceramic mandrel 20 which is positioned in a hole 18 extending through the support plate 10 on the opposite side from the location of the eye 16. The mandrel 20 may be any suitable high temperature material which is also an electrical insulator, e.g., aluminum oxide. A first pair of electrically conducting strips 22 are deposited on the mandrel 20 adjacent to one end thereof. The electrical conductors 22 may be of any suitable material and may be deposited by any suitable process, e.g. printed circuit technique. The first pair of strips 22 extend from one end of the mandrel 20 to a length approximately one-third of the length of the mandrel 20. The first pair of conducting strips 22 are soldered to the support plate 10 by conventionally applied solder 26 between the support plate 10 and the first pair of the conducting strips 22. A second set of electrically conducting strips 24 are disposed adjacent to the other end of the mandrel 20 in a similar fashion to that used for the first pair of strips 22. The second pair of strips 24 are disposed in a physically separated configuration whereby these strips are electrically isolated from each other and from the first pair of strips 22 by the electrical resistivity of the mandrel 20. The first and second pair of strips 22 and 24 can be formed by a technique wherein they are deposited as two continuous strips extending along the full length of the mandrel 20, and a center portion of each strip is, subsequently, removed by any suitable means to form the first and second pairs of conducting strips 22 and 24. Further, since the first pair of strips 22 are only used to provide a convenient means for attaching the stylus 17 to the support plate 10, they need not be physically separated and the preceding discussion is directed to the illustrated embodiment wherein the first and second pairs of strips 22 and 24 are deposited concurrently and are substantially identical in configuration.

The second pair of conducting strips are each attached to a respective one of a pair of electrical conductors 25 contained in an electrical cable 26. The cable 26 is loosely wrapped on the guide way 6 and is arranged to have its internal electrical leads 25 suitable for connection to a source of electrical power (not shown). The end of the mandrel 20 adjacent to the second pair of strips 24 is formed in a dome-shaped configuration. It should be noted that both ends of the mandrel 20 can be formed in this configuration which, in combination with an electrical isolation for all of the conducting strips 20 and 24, would provide a reversible stylus element. An electrical resistance material 30 is deposited on the dome-shaped end of the mandrel 20 in electrical contact with the second pair of conducting strips. This resistance material 30 may be any suitable material exhibiting a high electrical resistance compared to the second pair of conducting strips and capable of being deposited on the mandrel 20, e.g., a carbon glaze. In the case of the aforesaid reversible stylus construction, the resistance material can either be deposited on one stylus end randomly selected during an automated manufacturing process or on both ends to provide a replaceable recording tip.

In operation, the stylus 17 of the recording apparatus of the present invention is energized by electrical power applied through the leads 25 of the cable 26. Using a typical value of ninety ohms for the resistance material 30 on the mandrel 20, a current of 100 milliampers passed through the resistive material 30 will produce a temperature of approximately 400 degrees Fahrenheit on the outside surface of the resistor material 30. This temperature, when applied to the recording medium 1, is effective to produce the desired reaction in the emulsion coating covering the heat sensitive recording medium 1 to produce the waveshape 4. The unbalanced minimal weight of the stylus assembly 17 and the support plate 10 is arranged to exert, in response to gravity, a small downward thrust on the resistor material 30 to maintain a contact with the recording medium 1 while allowing the recording medium 1 to pass between the stylus 17 and the roller 2. The support member 10 is selectively moved on the guide way 16 in response to recording signals arranged to energize the drive means for the support member 10. The movement of the support plate 10 is effective to move the stylus 17 across the recording medium 1 to produce the recording 4 by means of the heated resistance material 30. This movement of the support member is, also, communicated to the cable 26 which slides on the guidway 6 to follow the motion of the support member 10 while providing an electrical connection to the stylus 17. The composite stylus 17 can be easily removed from the support member 10 by unsoldering the stylus 17 from the wire 25 and the support member 10, while a new stylus is mounted by a reversal of this process. It should be noted that other means for attaching the stylus 17 to the support member 10, e.g., a spring clip mounted on the support member 10, may be used without departing from the scope of this invention. Further, the stylus 17 may be one of a plurality of similar styli mounted on a common base member and separately energized.

Accordingly it may be seen that there has been provided in accordance with the present invention, a stylus and a recorder supporting the stylus in a recorder/recording on a heat-sensitive recording medium.

The embodiments of the invention is which an exclusive property or privilege is claimed are defined as follows:

1. A recording element comprising an electrically insulating mandrel,
   a pair of electrical conductors attached to said mandrel, said electrical conductors being electrically isolated from each other and extending over a portion of the surface of said mandrel,
   means on said mandrel for attaching said mandrel to a support member, said last-mentioned means being electrically isolated from said pair of electrical conductors and
   a resistive element supported on one end of said mandrel and in electrical contact with said pair of electrical conductors, wherein said last-mentioned means is a second pair of electrical conductors attached to said mandrel and electrically isolated from each other.

2. A recording element as set forth in claim 1 and including a second resistive element supported on a second end of said mandrel and in electrical contact with said second pair of electrical conductors.

3. A recording element comprising an electrically insulating mandrel,
   a pair of electrical conductors attached to said mandrel, said electrical conductors being electrically isolated from each other and extending over a portion of a surface of said mandrel;
   means on said mandrel for attaching said mandrel to a support member, said last-mentioned means being electrically isolated from said pair of electrical conductors and;
   a resistive element supported on one end of said mandrel and in electrical contact with said pair of electrical conductors,
   wherein said last-mentioned means is a second pair of electrical conductors attached to said mandrel and aligned with said first mentioned pair of electrical conductors.

4. A recording member as set forth in claim 3 wherein said second pair of conductors and said first-mentioned pair of conductors are plated on said mandrel.

5. A combination comprising an electrically insulating mandrel having a characterized recording end,
   a pair of electrical conductors supported on said mandrel, said electrical conductors being electrically isolated from each other,
   support means on said mandrel for attaching said mandrel to a support member, said support means being electrically isolated from said pair of electrical conductors and
   a resistive element supported on said mandrel and in contact with a portion of the surface of said mandrel on said characterized end, said resistive element being arranged to be in electrical contact with said pair of electrical conductors,
   wherein said support means is a second pair of electrical conductors attached to said mandrel and electrically insulated from each other and including a support member arranged to be attached to said support means on said mandrel and means for connecting said pair of electrical conductors to a source of an electrical energizing signal.

6. A combination as set forth in claim 5 and including means for supporting said support member while allowing a movement thereof and means for selectively moving said support member.

7. A combination comprising an electrically insulating mandrel having a characterized recording end,
a pair of electrical conductors supported on said mandrel, said electrical conductors being electrically isolated from each other,
support means on said mandrel for attaching said mandrel to a support member, said support means being electrically isolated from said pair of electrical conductors and
a resistive element supported on said mandrel and in contact with a portion of a surface of said mandrel on said characterized end, said resistive element being arranged to be in electrical contact with said pair of electrical conductors, wherein said mandrel has a second characterized end and including a second resistive element supported on said mandrel and in contact with a portion of surface of said second characterized end of said mandrel and wherein said support means on said mandrel is a second pair of electrical conductors supported on said mandrel and electrically isolated from each other while being arranged to be in electrical contact with said second resistive element.

8. A recording element comprising an electrically insulating mandrel having a characterized end,
a pair of electrical conductors attached to said mandrel, said electrical conductors being electrically isolated from each other and extending over a portion of the surface of said mandrel,
means on said mandrel for attaching said mandrel to a support member, said last-mentioned means being electrically isolated from said pair of electrical conductors and
a resistive element supported in contact with said characterized end of said mandrel and in electrical contact with said pair of electrical conductors, wherein said last-mentioned means is a second pair of electrical conductors attached to said mandrel and electrically isolated from each other.

9. A recording element as set forth in claim 8 and including a second characterized end on said mandrel and a second resistive element supported in contact with said second end and in electrical contact with said second pair of conductors.

* * * * *

UNITED STATES PATENT OFFICE
CERTIFICATE OF CORRECTION

Patent No. 3,699,588                Dated October 17, 1972

Inventor(s) Bertil Eck et al.

It is certified that error appears in the above-identified patent and that said Letters Patent are hereby corrected as shown below:

On the cover sheet in the heading [72] "Bertil Eck Warrington; Michael J. Cash, both of Phila., Pa." should read -- Bertil Eck, Warrington; Michael J. Cash, Philadelphia, Pa. --. On the cover sheet, the identification of the inventors at the top of the patent should read -- Eck et al -- .

Signed and sealed this 20th day of March 1973.

(SEAL)
Attest:

EDWARD M. FLETCHER, JR.
Attesting Officer

ROBERT GOTTSCHALK
Commissioner of Patents